US007958136B1

(12) United States Patent
Curtis et al.

(10) Patent No.: US 7,958,136 B1
(45) Date of Patent: Jun. 7, 2011

(54) SYSTEMS AND METHODS FOR IDENTIFYING SIMILAR DOCUMENTS

(75) Inventors: Taylor Curtis, Santa Monica, CA (US); Kenneth Heafield, Cambridge, MA (US)

(73) Assignee: Google Inc., Mountain View, CA (US)

( * ) Notice: Subject to any disclaimer, the term of this patent is extended or adjusted under 35 U.S.C. 154(b) by 461 days.

(21) Appl. No.: 12/050,626

(22) Filed: Mar. 18, 2008

(51) Int. Cl.
*G06F 17/30* (2006.01)
(52) U.S. Cl. .................... 707/758; 707/705; 707/802
(58) Field of Classification Search .......... 707/999.003, 707/705, 758, 802
See application file for complete search history.

(56) References Cited

U.S. PATENT DOCUMENTS

| | | | | | |
|---|---|---|---|---|---|
| 5,826,261 | A | * | 10/1998 | Spencer ................................ | 1/1 |
| 5,867,799 | A | * | 2/1999 | Lang et al. ............................. | 1/1 |
| 5,963,893 | A | * | 10/1999 | Halstead et al. .................... | 704/9 |
| 6,366,759 | B1 | * | 4/2002 | Burstein et al. ............... | 434/353 |
| 6,385,579 | B1 | * | 5/2002 | Padmanabhan et al. ....... | 704/243 |
| 6,507,839 | B1 | * | 1/2003 | Ponte ..................................... | 1/1 |
| 6,678,694 | B1 | * | 1/2004 | Zimmermann et al. ....... | 707/731 |
| 6,810,376 | B1 | * | 10/2004 | Guan et al. .......................... | 704/9 |
| 6,990,628 | B1 | * | 1/2006 | Palmer et al. .................. | 715/234 |
| 7,185,001 | B1 | * | 2/2007 | Burdick et al. ....................... | 1/1 |
| 7,200,587 | B2 | * | 4/2007 | Matsubayashi et al. ...... | 707/758 |
| 7,246,117 | B2 | * | 7/2007 | Peh ........................................ | 1/1 |
| 7,370,034 | B2 | * | 5/2008 | Franciosa et al. ............. | 707/749 |
| 7,536,413 | B1 | * | 5/2009 | Mohan et al. ......................... | 1/1 |
| 7,567,953 | B2 | * | 7/2009 | Kadayam et al. ..................... | 1/1 |
| 7,765,218 | B2 | * | 7/2010 | Bates et al. .................... | 707/752 |
| 2003/0018629 | A1 | * | 1/2003 | Namba .............................. | 707/3 |
| 2004/0015342 | A1 | * | 1/2004 | Garst ................................... | 704/5 |
| 2004/0044952 | A1 | * | 3/2004 | Jiang et al. ..................... | 715/500 |
| 2004/0111264 | A1 | * | 6/2004 | Wang et al. ..................... | 704/257 |
| 2005/0228783 | A1 | * | 10/2005 | Shanahan et al. ................. | 707/3 |
| 2005/0256712 | A1 | * | 11/2005 | Yamada et al. ................. | 704/255 |
| 2006/0112068 | A1 | * | 5/2006 | Zhang et al. ....................... | 707/1 |
| 2006/0149820 | A1 | * | 7/2006 | Rajan et al. .................... | 709/206 |
| 2006/0230033 | A1 | * | 10/2006 | Halevy et al. ...................... | 707/3 |
| 2006/0242190 | A1 | * | 10/2006 | Wnek .............................. | 707/102 |
| 2007/0019864 | A1 | * | 1/2007 | Koyama et al. ................ | 382/218 |
| 2007/0112898 | A1 | * | 5/2007 | Evans et al. .................... | 707/205 |
| 2007/0174267 | A1 | * | 7/2007 | Patterson et al. .................. | 707/5 |
| 2008/0205775 | A1 | * | 8/2008 | Brinker et al. ................ | 382/225 |
| 2009/0037389 | A1 | * | 2/2009 | Kothari et al. ..................... | 707/3 |
| 2009/0125498 | A1 | * | 5/2009 | Cao et al. ........................... | 707/5 |

(Continued)

OTHER PUBLICATIONS

Wang et al., "An Unsupervised Quantitative Measure for Word Prominence in Spontaneous Speech", IEEE, 2005, pp. 377-380, accessed online at <http://ieeexplore.ieee.org/stamp/stamp.jsp?arnumber=01415129&tag=1> on Jul. 1, 2010.*

(Continued)

*Primary Examiner* — Hung T Vy
*Assistant Examiner* — Phuong-Thao Cao
(74) *Attorney, Agent, or Firm* — Sterne, Kessler, Goldstein & Fox, P.L.L.C.

(57) ABSTRACT

The present invention provides systems and methods for identifying similar documents. In an embodiment, the present invention identifies similar documents by (1) receiving document text for a current document that includes at least one word; (2) calculating a prominence score and a descriptiveness score for each word and each pair of consecutive words; (3) calculating a comparison metric for the current document; (4) finding at least one potential document, where document text for each potential document includes at least one of the words; and (5) analyzing each potential document to identify at least one similar document.

25 Claims, 8 Drawing Sheets

U.S. PATENT DOCUMENTS

2009/0125805 A1* 5/2009 Ananthanarayanan et al. ............................ 715/255
2009/0198677 A1* 8/2009 Sheehy et al. .................... 707/5

OTHER PUBLICATIONS

Brants et al., "Finding Similar Documents in Document Collection", Proceedings of the Third International Conference on Language Resources and Evaluation, 2002, 7 pages.*

Wan et al., "Document Similarity Search Based on Generic Summaries", AIRS 2005, pp. 635-640.*

Cooper et al., "A Novel Method for Detecting Similar Documents", Proceedings of the 35th Annual Hawaii International Conference on System Sciences, 2002, 7 pages.*

Cooper et al., "Anti-Serendipity—Finding Useless Documents and Similar Documents", Proceedings of the 33rd Hawaii International Conference on System Sciences, 2000, 9 pages.*

E. Gacia, "Term Vector Theory and Keyword Weights—An Introduction Series on Term Vector Theory for Information Retrieval Students and Search Engines Marketers", 2006, 5 pages, accessed online at <http://www.miislita.com/term-vector/term-vector-1.html> on Jan. 8, 2011.*

Lee et al., "Using Fuzzy-Word Correlation Factors to Compute Document Similarity Based on Phrase Matching", FSKD 2007, Aug. 24-27, 2007, vol. 2, pp. 186-192.

Lai et al., "Similarity Score for Information Filtering Thresholds", ISCIT 2004, Oct. 26-29, 2004, vol. 1, pp. 216-221.

Li et al., "An Efficient Document Categorization model Based on LSA and BPNN", ALPIT 2007, Aug. 22-24, 2007, pp. 9-14.

Tata et al., "Estimating the Selectivity of *tf-idf* based Cosine Similarity Predicates", SIGMOD Record, Jun. 2007, vol. 36, No. 2, pp. 7-12.

Blei et al., "Latent Dirichlet Allocation", Journal of Machine Learning Research 3, Jan. 2003, pp. 993-1022.

* cited by examiner

Album title: "Paris and the Eiffel Tower" ~702

Photo description: "Rachel and her cat visit the Eiffel Tower" ~722

Vector Coefficients ~790

| | |
|---|---|
| Rachel | 0.0943 |
| cat | 0.4400 |
| visit | 0.0628 |
| Eiffel | 0.0252 |
| Tower | 0.0236 |
| cat visit | 0.0314 |
| Eiffel Tower | 0.6919 |
| Paris | 0.3624 |

Descriptiveness Scores ~770

| | |
|---|---|
| Rachel | 0.300 |
| cat | 1.555 |
| visit | 0.222 |
| Eiffel | 1.600 |
| Tower | 1.500 |
| cat visit | 1.000 |
| Eiffel Tower | 2.316 |
| Paris | 1.844 |

Prominence Scores ~760

| | |
|---|---|
| Rachel | 4.000 |
| cat | 3.600 |
| visit | 3.600 |
| Eiffel | 0.200 |
| Tower | 0.200 |
| cat visit | 0.400 |
| Eiffel Tower | 3.800 |
| Paris | 2.500 |

Scaling Factor ~780

| | $(P*D)^2$ |
|---|---|
| Rachel | 1.4400 |
| cat | 31.338 |
| visit | 0.6387 |
| Eiffel | 0.1024 |
| Tower | 0.0900 |
| cat visit | 0.1600 |
| Eiffel Tower | 77.454 |
| Paris | 21.252 |

| Normalization | QS | SF |
|---|---|---|
| 11.51 | 0.905 | 0.0786 |

Bigram Probabilities ~730

| | |
|---|---|
| cat visit | 0.10 |
| Eiffel Tower | 0.95 |

Non-compound Likelihoods ~740

| | |
|---|---|
| Rachel | 1.00 |
| cat | 0.90 |
| visit | 0.90 |
| Eiffel | 0.05 |
| Tower | 0.05 |
| Paris | 1.00 |

Term Weights ~750

| | |
|---|---|
| Photo tag | 4.2 |
| Photo description | 4.0 |
| Album title | 2.5 |
| Album location | 2.0 |
| Album description | 1.0 |

FIG. 7

SYSTEMS AND METHODS FOR IDENTIFYING SIMILAR DOCUMENTS

FIELD OF THE INVENTION

The present invention relates to identifying similar documents.

BACKGROUND OF THE INVENTION

Identifying related documents is a common technique on the Internet. It can help users discover new documents that are similar in design, type, or content to a known document a user has chosen. The user benefits from the knowledge of this new document and the particular website benefits from increased traffic and/or increased sales. In some cases, documents are compared by their associated text. Cosine similarity, latent semantic analysis, probabilistic latent semantic analysis, and latent Dirichlet allocation are a few methods used to identify these related documents.

However, identifying related documents is a difficult process, and improvements can always be made to the existing methods. For example, term frequency-inverse document frequency (Tf-idf), the most commonly used algorithm for weighting word occurrences in methods to identify related documents, has at least two drawbacks. First, some rare words that carry little meaning, like "perspicacity" or "splendiferous," are assumed to be informative. Second, some common words that may be meaningful, like "airplane" or "purple," are assumed to be uninformative. This can lead to results where misspellings or numbers containing many digits are thought to properly describe the user's current document, and are used to compare to other documents, or where meaningful words are ignored when comparing with other documents. Certain issues, such as identifying important words or handling pairs of words, must be addressed if any of the above mentioned methods are to be implemented.

What is needed are techniques that address these issues so as to provide a more accurate way to identify related documents quickly.

BRIEF SUMMARY

This invention relates to identifying similar documents. A system embodiment of this invention identifies documents similar to a current document. A system embodiment includes a compound likelihood database, a descriptive database, and a similar document identifier. The compound likelihood database contains, for each applicable pair of consecutive words, a probability that the respective pair of consecutive words has meaning distinct from each word in the pair. The descriptive database stores descriptiveness scores for words and pairs of consecutive words. The similar document identifier, provided with a current document, consults the compound likelihood and descriptive databases to identify similar documents based on scores associated with common words and pairs of consecutive words.

A method embodiment of this invention identifies documents similar to a current document. The method embodiment includes receiving document text for a current document that includes at least one word, calculating a prominence score and a descriptiveness score for each word and each pair of consecutive words, and calculating a comparison metric for the current document. The method further includes finding at least one potential document, where document text for each potential document includes at least one of the words, and analyzing each potential document to identify at least one similar document.

In this way, documents related to a document a user currently has can be found, taking into account the relative weights of each word associated with the user document, how descriptive each word is, and their probability of being part of a compound.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 7 is an example similar document identification calculation according to an embodiment of the present invention.

DETAILED DESCRIPTION OF EMBODIMENTS

The present invention relates to identifying similar documents. This can include identifying similar documents based on a vector-space algorithm. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for identifying similar documents in greater detail.

System

Figure 1:
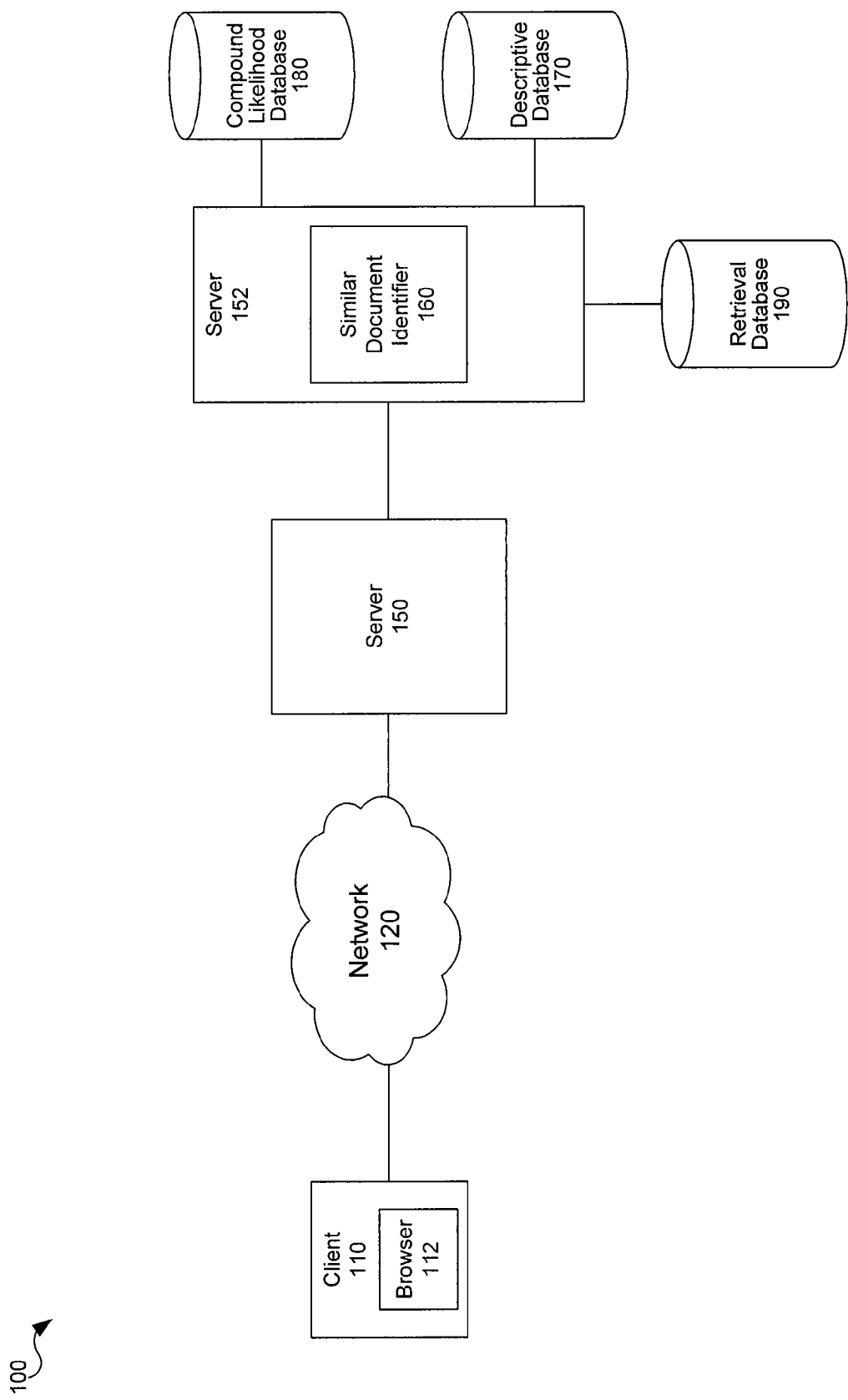
FIG. 1 is an architecture diagram of a system for identifying similar documents according to an embodiment of the present invention.

This section describes a system suitable for identifying similar documents. As used herein, the term "document" includes, but is not limited to, text, photos, videos, audio, webpages, search queries and other communication mediums having text. Text in a document can be data in the document or metadata associated with the document. FIG. 1 is an architecture diagram of a system for identifying similar documents according to an embodiment of the present invention. FIG. 1 shows system 100. System 100 includes a client 110, a server 150, a server 152, a descriptive database 170, a compound likelihood database 180, and a retrieval database 190, coupled by one or more networks 120. As used herein, the term "database" includes, but is not limited to, table databases, hierarchical databases, network databases, relational databases, dimensional databases, and object databases.

Each of client 110, server 150, server 152, descriptive database 170, compound likelihood database 180, and retrieval database 190 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing device may include software, firmware, hardware, or a combination thereof. Software may include one or more applications and an operating system. Hardware can include, but is not limited to, a processor, memory and graphical user interface display.

Client 110, server 150, server 152, descriptive database 170, compound likelihood database 180, and retrieval database 190 may be implemented on one or more computing devices at the same or at different locations. For instance, client 110, server 150, server 152, descriptive database 170, compound likelihood database 180, and retrieval database 190 may be remote from one another on different computing devices coupled to a network, such as network 120. In still another example, server 150, server 152, descriptive database 170, compound likelihood database 180, and retrieval database 190 may be implemented on one or more computing devices at a common location and coupled to a remote client 110 over network 120. Other combinations and configuration for arranging client 110, server 150, server 152, descriptive database 170, compound likelihood database 180, and retrieval database 190 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

In one exemplary embodiment, client 110 includes a browser 112. For example, browser 112 may be a web browser or other type of browser for browsing content. Browser 112 can send a request over network 120 to server 150 and receive a response from server 150. As an example, not to limit the present invention, the request may be a hypertext transfer protocol (HTTP) request. The HTTP request may contain parameters entered by a user using a user interface. The response may be an HTTP response. An HTTP response may contain web content, such as a hypertext markup language (HTML), images, video, or multimedia content.

Server 150 may include a web server or may be coupled to communicate with a web server at the same or a different location. A web server is a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, multimedia features, or any combination thereof. This example is strictly illustrative and does not limit the present invention.

Server 152 may include a backend server that holds multiple web application services. According to an embodiment, server 152 includes similar document identifier 160. Automatically, or at the request of a user, similar document identifier 160 identifies one or more documents that are similar to the user's current document. Similar document identifier 160 then notifies the user of these similar documents.

Similar document identifier 160 extracts a set of words from the current document. The set of words may appear within metadata fields associated with the current document. Automatically, or at the request of the user, similar document identifier 160 sends a query to descriptive database 170, compound likelihood database 180 and/or retrieval database 190 based on the set of words. One or all of the databases return their results to similar document identifier 160, such that similar document identifier 160 can then identify documents similar to the current document.

Compound likelihood database 180 contains an association between bigrams and their bigram probabilities. Bigrams refer to a phrase consisting of two consecutive words. As used herein, bigrams may also be referred to as compounds or any two parts that make up a word or phrase. Compound likelihood database 180 may contain information before system 100 is run, as is described below.

The bigram probability is a measure of the likelihood that two words adjacent to each other could be combined to form a meaningful compound. In an embodiment, these probabilities are computed beforehand, and then stored in compound likelihood database 180. Bigram probabilities may be computed by analyzing a training corpus, where the text of the training corpus exhibits similar compounding patterns as a corpus of the current document type. The training corpus may be representative of many types of documents. As described herein, a type of document may refer to whether the document falls into a category as being a webpage, photo, video, text file, etc.

In an embodiment, bigram probabilities are directly proportional to the number of times a given compound appears in the training corpus, and are indirectly proportional to the number of times a first word of the given compound and a second word of the given compound occur within a certain distance of each other in the training corpus. This bigram probability computation assumes that true compounds or non-compositional compounds consist of words that are generally unrelated to each other, while false compounds or compositional compounds consist of words that appear together because of their relatedness. As an example, "robot chicken" may be a true compound, and "chocolate cake" may be a false compound. As is discussed later, this method for identifying similar documents assumes there is a continuum of compositionality that captures both the extent to which a bigram has a compositional meaning and the probability that this meaning is the one intended by the words of the bigram, and tries to find a measured position on this continuum. Finding bigram probabilities is then an important step in eventually finding related documents. Bigram probabilities will be further described in greater detail below.

Descriptive database 170 contains an association between strings of one of more words and their descriptiveness scores. In an embodiment, descriptive database 170 includes descriptiveness scores for unigrams and bigrams. Unigrams refer to single words. A word defined as a unigram may also be present in a phrase defined as a bigram. Again, descriptive database 170 may contain information before system 100 is run, as is described below. Descriptiveness scores will also be described in greater detail below.

Retrieval database 190 contains an association between documents and their words, non-compound likelihoods, and document multipliers. Non-compound likelihoods and document multipliers will be described in greater detail below.

Each of browser 112 and similar document identifier 160 may be implemented as software, hardware, firmware, or any combination thereof.

Figure 2:
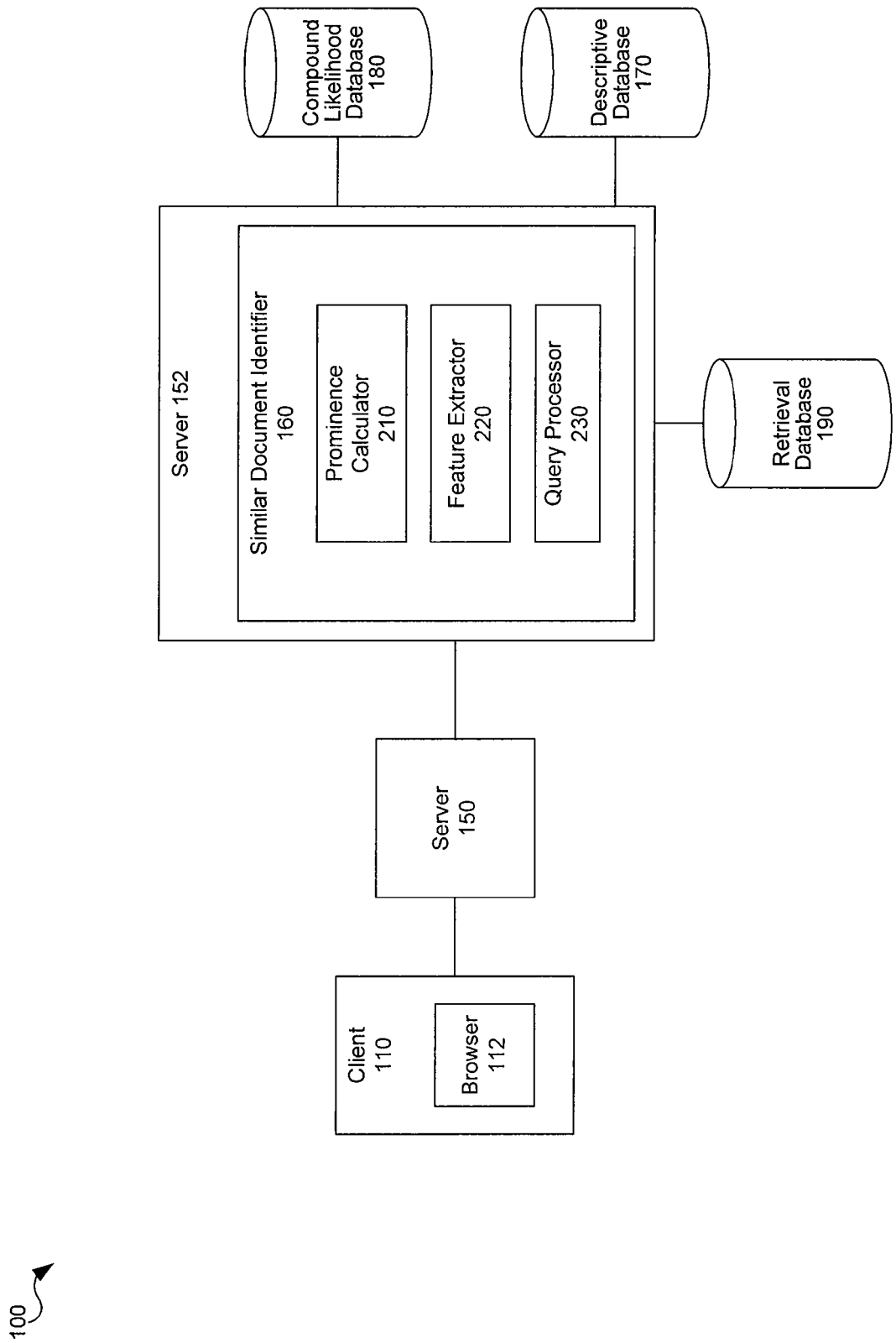
FIG. 2 is a more detailed diagram of the components of the system in FIG. 1, according to an embodiment of the present invention.

FIG. 2 is a more detailed diagram of the components of system 100 in FIG. 1, according to an embodiment of the present invention. As shown in FIG. 2, client 110 may communicate with server 150, server 150 may communicate with server 152, and server 152 may communicate with descriptive database 170, compound likelihood database 180, and retrieval database 190. In an alternate embodiment, not shown, descriptive database 170, compound likelihood database 180, and retrieval database 190 reside within memory in server 152. As discussed previously, this communication may take place over one or more networks 120, such as the Internet.

Similar document identifier 160 includes a prominence calculator 210, a feature extractor 220, and a query processor 230. Prominence calculator 210 provides a prominence score to feature extractor 220. Feature extractor 220 then provides metrics of comparison to query processor 230, such that similar documents can be identified. Prominence calculator 210 calculates the prominence score for unigrams and/or bigrams that appear in the set of words that correspond to a respective document. In an embodiment, the prominence score for each unigram is dependent on its term weight and its non-compound likelihood, and the prominence score for each bigram is dependent on its term weight and its bigram probability. The term weight of the unigram or bigram may be determined based on a metadata field in which the unigram or bigram was found. As an example, the respective document may have metadata fields for a title and a description. If the unigram or bigram is found in the title, it may be deemed more important, and hence given a higher weight, than another unigram or bigram that is found in the description. In this way, taking into account term weights eventually allows for a more refined metric of comparison for the respective document.

In an embodiment, for a bigram, the prominence score then is just its term weight multiplied by its bigram probability. For a unigram, the prominence score is its term weight multiplied by a probability that the unigram and a word to the left of the unigram is not a bigram and a probability that the unigram and a word to the right of the unigram is not a bigram. The product of the probability that the unigram and the word to the left of the unigram is not a bigram and the probability that the unigram and the word to the right of the unigram is not a bigram is also known as a non-compound likelihood. Note that since the non-compound likelihood for a particular unigram depends on its neighbors, identical unigrams found in the same or different metadata field may result in different non-compound likelihoods. If, for example, there is no word to the left of the unigram, then the probability that the combination is not a bigram is set to one. The same applies for the case when there is no word to the right of the unigram. In the case where a unigram or bigram is found in multiple metadata fields, the metadata field that leads to a highest prominence score is chosen, and the others are discarded. As an example, if bigram probabilities are represented as values from 0 to 1, then the following two equations may define prominence scores for unigrams and bigrams, respectively:

$$P(u) = \max_{u_i = u}((1 - k(b_{i-1})) * (1 - k(b_i)) * w(i)) \quad (1)$$

$$P(b) = \max_{b_i = b}(k(b) * w(i)) \quad (2)$$

In the above equations, $u_i$ refers to the ith word in the document, while $b_i$ refers to the bigram formed by word $u_i$ immediately followed by $u_{i+1}$, if any. The function $k(x)$ refers to the bigram probability of bigram x and is 0 if no such bigram exists, as happens at the boundaries of metadata fields. The weight function $w(i)$ refers to the weight assigned to the metadata field in which word i falls.

In this way, the above mentioned prominence score calculations can properly account for unigrams and bigrams without weighing re-occurrences too heavily, which may lead to skewed results, and addresses the problem of redundancy across metadata fields.

Feature extractor 220 calculates a metric for comparison, such as, for example, a scoring vector, for the current document and any potential documents that may be found based on a query using unigrams and/or bigrams that appear in the set of words that correspond to the current document. For the purposes of this description, a scoring vector will be used herein as an example metric for comparison. However the following described methodologies may apply to any metric for comparison.

The scoring vectors may depend on prominence scores and descriptiveness scores of unigrams and/or bigrams that correspond to the respective document. In an embodiment, the descriptiveness score for each unigram or bigram conveys how informative or specific each unigram or bigram is on average in describing a document in a corpus. A more descriptive word tends to be more informative when appearing in documents in the corpus than a less descriptive word. The descriptiveness score for each unigram or bigram may depend on their respective frequencies in a training corpus. The descriptiveness score is then a corpus-dependent, document-independent measure.

In an embodiment, descriptiveness scores of unigrams and bigrams may be computed by analyzing at least two corpora: at least one purpose-relevant corpus and a background corpus. The purpose-relevant corpus may contain a distribution of word occurrences that resembles a distribution in a corpus from which the current document is drawn. As an example, if the corpus of the current document contains a distribution of words that are skewed towards those words related to sports, the purpose-relevant corpus may be made up of a set of documents that contain a distribution skewed towards words related to sports. In other embodiments, the purpose-relevant corpus may contain a set of documents that are relevant in performing a desired task on the current document, such as finding similar documents to the current document. In some cases, the purpose-relevant corpus may also include potential documents that are found based on a query using unigrams and/or bigrams that appear in the set of words that correspond to the current document. The background corpus may be of any document type, and may be similar to the training corpus analyzed in prominence calculator 210. As an example, the background corpus may include documents found on the Internet. Dividing a number of times a unigram or bigram appears in the purpose-relevant corpus by a number of times the unigram or bigram appears in the background corpus may yield a descriptiveness score for the unigram or bigram.

Other factors may be taken into account as well to further identify the descriptiveness of each unigram or bigram. For example, unigrams or bigrams that describe the type of document may result in high descriptiveness scores according to the above calculation, yet not actually be descriptive of the respective document. In the case where the purpose is to find similar photos using their associated text, with the purpose-relevant corpus including image captions on the web, this may occur if a user describes the current image as a "photo" or "picture." These types of unigrams and bigrams may then be intentionally down-weighted by altering the algorithm. In another example, non-celebrity names often appear within documents, but suffer from ambiguity. Unigrams and bigrams that include these names may also be intentionally down-weighted. A list of celebrity names may be white listed, since those names may actually be significant and descriptive. Generally, any number of corpora may be taken, unigrams and bigrams may be counted in each corpus, and a weighted sum of these counts may be taken before or after dividing by the counts in the background corpus. These weights may be positive or negative. As an example, down-weighting may be completed by determining the weights so as to cancel effects. A corpus of web documents with images, white page listings, and celebrity listings can be taken. Names in the white page listings can be subtracted from the corpus containing web documents with images such that the number of names left in the corpus approximates the number of names present in a training corpus containing web documents with images.

And as a third example, advertisements may artificially inflate the descriptiveness of unigrams and bigrams, especially those that contain words commonly associated with images or the purpose-relevant corpus in the domain of advertisements, such as, for example "bedroom." This may be corrected by taking the initial descriptiveness calculation and comparing it to other Internet or non-Internet based corpora, such as, for example, a corpus of classified advertisements. The comparison may include performing an analogous computation where the purpose-relevant corpus is advertisements in order to find an advertisement descriptiveness score, and as an example, the advertisement descriptiveness score may then be subtracted from the calculated descriptiveness score. The descriptiveness score may also be enhanced by performing a hybrid of the above mentioned descriptiveness algorithm and inverse document frequency (IDF).

Query processor 230 takes scoring vectors from feature extractor 220 to determine similar documents. In an embodiment, query processor 230 compares and manipulates the scoring vectors to determine those potential documents that most closely resemble the current document. Query processor 230 is described in greater detail below with respect to FIG. 4.

Each of prominence calculator 210, feature extractor 220, and query processor 230 may be implemented as software, hardware, firmware, or any combination thereof.

Figure 3:
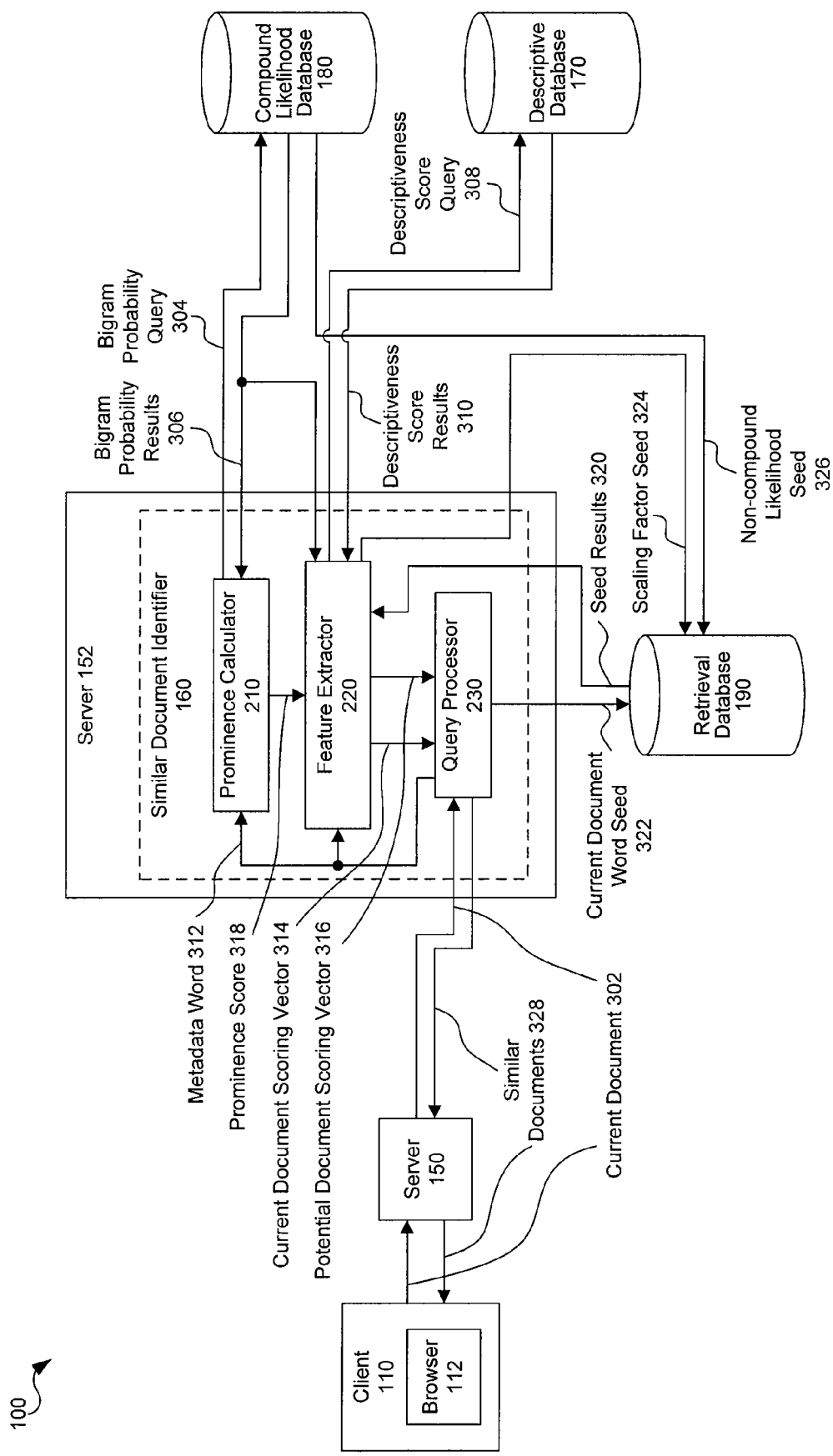
FIG. 3 is a diagram that displays how components of the system in FIG. 1 may interoperate, according to an embodiment of the present invention.

FIG. 3 is a diagram that displays how components of system 100 in FIG. 1 may interoperate, according to an embodiment of the present invention. In an embodiment, browser 112 may send a current document 302 to query processor 230 through server 150. Current document 302 represents the user's current document. As an example, between browser 112 and server 150, current document 302 may be HTTP parameters generated by browser 112. In an example, a user may request a listing of similar documents within a user interface by pressing a submit button. This triggers browser 112 to generate an HTTP request that includes current document 302 as HTTP parameters. This example is merely illustrative and is not intended to limit the present invention.

Current document 302 includes a set of metadata fields. In an example, each metadata field may include, but is not limited to, text that describes the document. Text in each metadata field may include unigrams and/or bigrams.

Query processor 230 takes the text from the metadata fields of current document 302, and sends the unigrams and/or bigrams found to prominence calculator 210 and feature extractor 220 in the form of a metadata word 312. In an embodiment, query processor 230 sends unigrams and/or bigrams from one metadata field at a time, until all of the metadata fields have been analyzed. In an alternate embodiment, query processor 230 sends unigrams and/or bigrams from all of the metadata fields at once.

In an embodiment, at a same or different time, query processor 230 also takes unigrams and/or bigrams from all of the metadata fields, as well as the term weights associated with each metadata field, and sends them to retrieval database 190 in the form of a current document word seed 322. Retrieval database 190 stores information found in current document word seed 322, and current document word seed 322 also initiates a query based on the unigrams and/or bigrams. Retrieval database 190 finds other documents associated with at least one of the unigrams and/or bigrams, and sends the document information, which includes the document, its unigrams and/or bigrams, its document multipliers and the bigram probabilities associated with each unigram and an adjacent word, to feature extractor 220 in the form of seed results 320.

In a second embodiment, not shown, current document word seed 322 only includes unigrams and/or bigrams from each metadata field and the term weights for each metadata field. Current document word seed 322 initiates a query based on the unigrams and/or bigrams. Retrieval database 190 finds other documents associated with at least one of the unigrams and/or bigrams, and sends each document to feature extractor 220 in the form of seed results 320. Document multipliers and non-compound likelihoods may then be computed by feature extractor 220. Again, document multipliers will be described in greater detail below.

In a third embodiment, not shown, current document word seed 322 is not sent to retrieval database 190 until each unigram and bigram has been scored. Based on the scores, a scoring vector for the current document may be found and sent to retrieval database 190 as current document word seed 322. A component such as query processor 230 may be found in a retrieval system, where retrieval database 190 is located, to compare the scoring vector for the current document to the scoring vectors for those retrieved documents associated with at least one of the unigrams and/or bigrams. The scoring vectors for those retrieved documents can be found because the scoring vector for the current document includes descriptiveness scores for the relevant unigrams and/or bigrams and the bigram probabilities associated with each unigram and an adjacent word in the retrieved documents are stored and retrieved with their respective retrieved documents. The bigram probabilities may be pre-computed prior to being added to the retrieval system and can be used to determine prominence scores for each unigram and/or bigram. The top scoring documents may then be sent to feature extractor 220 in the form of seed results 320.

In a fourth embodiment, not shown, current document word seed 322 is not sent to retrieval database 190 until all unigrams and bigrams have been scored. Once scored, current document word seed 322 includes only those unigrams and/or bigrams whose score exceeds a given threshold. Again, this may help lower memory requirements and limit network bandwidth usage.

In some cases, unigrams and/or bigrams may be similar to other words. To accommodate these occurrences, variants may be taken into account when the query is performed. In an embodiment, unigrams and/or bigrams are partitioned into equivalence classes, where all members of a class are variants of each other. A query may then be performed on all unigrams and/or bigrams that fall within the class of the unigram and/or bigram in current document word seed 322. Variants may also be treated as the same word for the purposes of scoring. As an example, variants may include a singular and plural version of a unigram and/or bigram, such as "flower" and "flowers," and variants may include synonyms, such as "groundhog" and "woodchuck."

In an embodiment, metadata word 312 includes, but is not limited to, unigrams and/or bigrams of one or more metadata fields and an identification of the one or more metadata fields the unigrams and/or bigrams are found in. The metadata field may be indicated with a number. For example, if documents of the same type as the current document contain the same metadata fields, then a known association between a metadata field and a number can be set.

Once prominence calculator 210 receives metadata word 312, prominence calculator 210 generates a bigram probability query 304 based on the unigrams and/or bigrams found in metadata word 312. In an embodiment, bigram probability query 304 includes a combination of two adjacent unigrams from metadata word 312 or a bigram from metadata word 312. Bigram probability query 304 is sent to compound likelihood database 180, which finds the appropriate bigram probabilities and returns results back to prominence calculator 210 and feature extractor 220 in the form of bigram probability results 306. Multiple bigram probability queries 304 may be sent until all bigrams and/or all combinations of unigrams have received their bigram probabilities.

Based on bigram probability results 306 and the term weights associated with each metadata field, prominence calculator 210 can employ the algorithms mentioned above to come up with a prominence score for each unigram and/or bigram. The prominence score for bigrams may be directly found from its bigram probability, whereas the prominence score for unigrams may be found from the product of the complement of the bigram probabilities, or the non-compound likelihood. These prominence scores are sent to feature extractor 220 in the form of prominence scores 318 for further evaluation. In an embodiment, the bigram probabilities found for the combination of each unigram and an adjacent word are also compiled together to form a non-compound likelihood seed 326. Non-compound likelihood seed 326 is sent to retrieval database 190, where the bigram probabilities are stored and coupled to the stored current document word seed 322 of the current document. These bigram probabilities can then be used later in system 100 to determine non-compound likelihoods for unigrams of the current document.

Once feature extractor 220 receives bigram probability results 306, metadata word 312, and seed results 320, feature extractor 220 generates a descriptiveness score query 308 based on the unigrams and/or bigrams found in metadata word 312. In an embodiment, descriptiveness score query 308 includes a unigram or a bigram from metadata word 312. Descriptiveness score query 308 is sent to descriptive database 170, which finds the appropriate scores and returns results back to feature extractor 220 in the form of descriptiveness score results 310. Multiple descriptiveness score queries 308 may be sent until all unigrams and/or bigrams have received their descriptiveness scores. These descriptiveness scores are used along with prominence scores 318 to calculate and output a scaling factor seed 324, a current document scoring vector 314, and a potential document scoring vector 316 to query processor 230. Scaling factor seed 324 will be discussed in greater detail below.

Current document scoring vector 314 corresponds to a scoring vector for current document 302 and potential document scoring vector 316 corresponds to one or more scoring vectors for one or more potential documents that may be similar to current document 302. Feature extractor 220 may send all potential document scoring vectors 316 at once, in groups, or one at a time. In an embodiment, if a query on retrieval database 190 yields no potential documents, then potential document scoring vector 316 is a null vector. No potential documents may be found if the unigrams and/or bigrams from the current document are not particularly useful. An example of this may be if the current document is a webpage of images, and includes the unigrams "photo," "album," "miscellaneous," etc. Scaling factor 324 and the operation of feature extractor 220 will be described in greater detail below with respect to FIG. 4.

Prominence calculator 210 and feature extractor 220 may function at the same or different times.

Query processor 230 takes current document scoring vector 314 and potential document scoring vector 316 to identify similar documents. These similar documents are output to browser 112 through server 150 in the form of similar documents 328. As an example, between server 150 and browser 112, similar documents 328 may be an HTTP response. In an embodiment, the documents in similar documents 328 may appear in the form of their respective document type. For example, if the documents in similar documents 328 consist of webpages containing images, a user may see the results as webpages containing images in browser 112. The next section discusses the operation of query processor 230 in greater detail.

Figure 4:
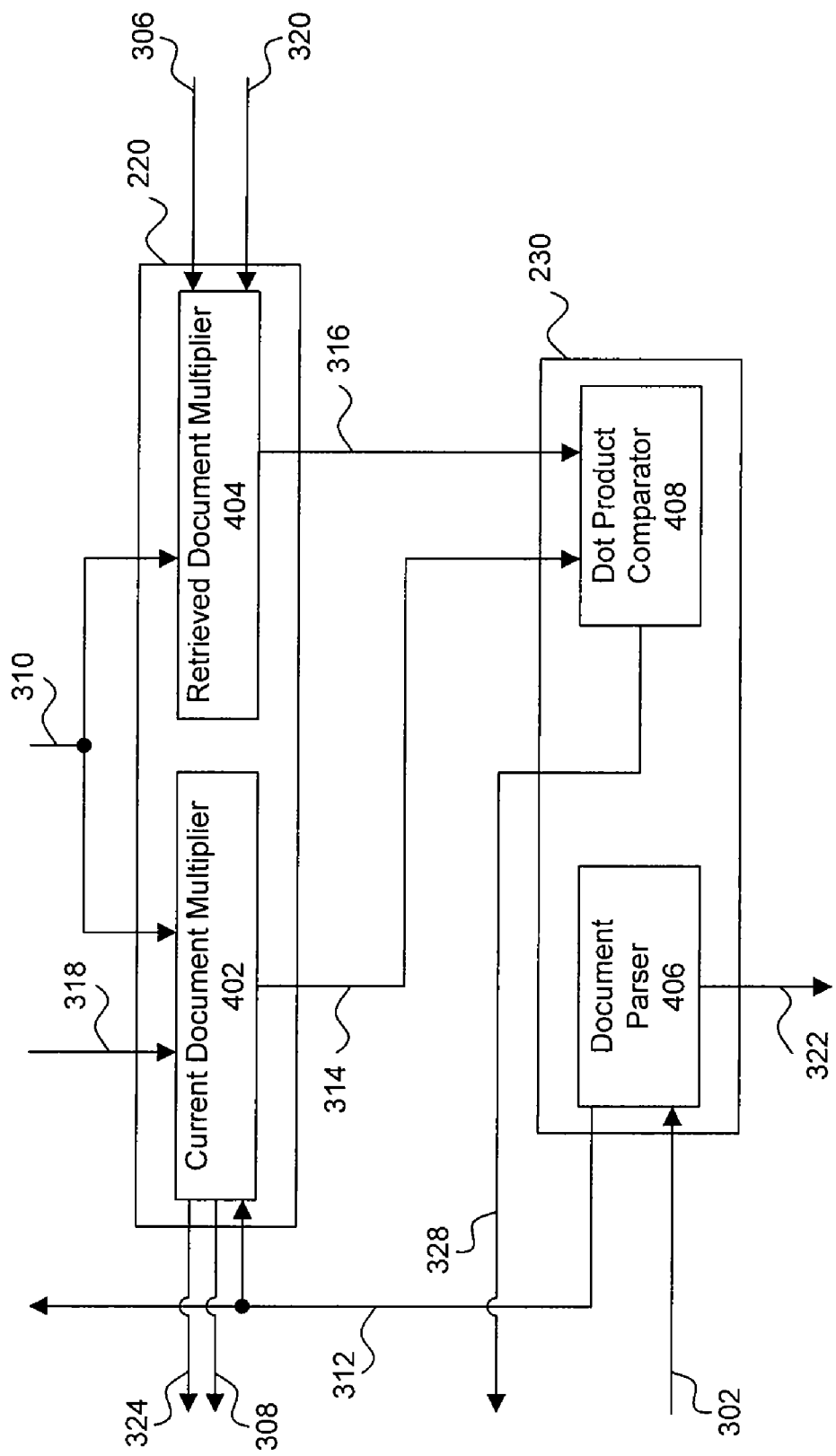
FIG. 4 is a more detailed diagram of the system in FIG. 1 according to an embodiment of the present invention.

FIG. 4 is a more detailed diagram of system 100 in FIG. 1 according to an embodiment of the present invention. More specifically, FIG. 4 is a more detailed diagram of feature extractor 220 and query processor 230. As shown in FIG. 4, feature extractor 220 includes a current document multiplier 402 and a retrieved document multiplier 404 and query processor 230 includes a document parser 406 and a dot product comparator 408. While feature extractor 220 and query processor 230 are described herein as including several separate components, the components may be combined, for example, so that the functionality of four components reside within a single component. Thus, the individual components shown in FIG. 4 are illustrative and not intended to limit the present invention.

Document parser 406 receives current document 302 from browser 112. In an embodiment, document parser 406 extracts unigrams and/or bigrams from the metadata found in current document 302. Document parser 406 then generates metadata word 312 based on the unigrams and/or bigrams. Document parser 406 may send multiple metadata words 312 until all unigrams and/or bigrams have been sent. In an embodiment, metadata word 312 is organized based on the metadata field each unigram and/or bigram is located in. Document parser 406 also generates current document word seed 322 based on the unigrams and/or bigrams found in the metadata of current document 302 and the term weights associated with each metadata field. Document parser sends metadata word 312 to prominence calculator 210 and feature extractor 220, and current document word seed 322 to retrieval database 190.

In an embodiment, current document multiplier 402 takes descriptiveness score results 310 and prominence scores 318 for each unigram and/or bigram and multiplies them together. A document vector can then be created based on each multiplied value, where each unigram and/or bigram functions as a dimension, and each multiplied value functions as the coefficient for its respective dimension. As is discussed below, a modified version of the document vector can then be used to compare with other documents. In order to facilitate comparison, the document vector may be normalized to unit length. Normalization may be completed by summing the squares of each multiplied value, and then taking a square root of the summation. As an example, the following equations may be used to compute coordinate $V_x$ of normalized document vector V:

$$Norm(T) = \sqrt{\sum_{y \in T} (P(y) * D(y))^2} \quad (3)$$

$$\forall x \in T, V_x = \frac{P(x) * D(x)}{Norm(T)} \quad (4)$$

where P(x) refers to the prominence score of x found in prominence scores 318, D(x) refers to the descriptiveness score of x found in descriptiveness score results 310, and T refers to the set of unigrams and bigrams in the document.

If left as is, in some cases, a problem may occur. As an example, if a same unigram or bigram appears in only one metadata field for two documents, and no other unigrams or bigrams are present, then the normalization may yield identical vectors no matter the metadata field. This is true even if the first document has the unigram or bigram in a metadata field that is more heavily weighted than a metadata field where the unigram or bigram is located in the second document. To account for this potential problem, current document multiplier 402 also uses a quality factor.

In an embodiment, the quality factor is a function of the sum of all multiplied values and the sum of all multiplied values that originated from unigrams and/or bigrams in specific metadata fields. For example, if the total number of metadata fields is six, the specific metadata fields may be the three metadata fields that are the most weighted. As an example, the following equation may be used to calculate the quality factor:

$$Q = \frac{a + \frac{\sum_{x \in I} P(x) * D(x)}{\sum_{x \in T} P(x) * D(x)}}{a + 1.0} \quad (5)$$

where I refers to a set of unigrams or bigrams whose highest-scoring occurrence is in an important field in the document, T refers to all unigrams or bigrams in the document, and a is some constant. In an embodiment, a may be equal to 1.2.

A scaling factor can then be defined as the quality factor divided by the normalization. This scaling factor, sent to retrieval database 190 in the form of scaling factor seed 324, constitutes a document multiplier.

Current document multiplier 402 also sends current document scoring vector 314 to dot product comparator 408. In an embodiment, current document scoring vector 314 includes the document vector multiplied by the scaling factor. As described herein, the document vector multiplied by the scaling factor is also known as a scaled document vector. In an alternate embodiment, current document scoring vector 314 includes the document vector and the scaling factor. As is described below, the scaling factor may be multiplied following a dot product calculation.

In an embodiment, retrieved document multiplier 404 takes seed results 320, bigram probability results 306, and descriptiveness score results 310 to determine potential document scoring vector 316. Retrieved document multiplier 404 does not perform a separate query to receive descriptiveness score results 310, but instead receives descriptiveness score results 310 following the query made by current document multiplier 402. A prominence score may be determined for each bigram based on bigram probability results 306, as described above with respect to prominence calculator 210, since seed results 320 also includes the term weights for each word. As noted previously, seed results 320 includes the bigram probabilities for unigrams and an adjacent word. Using the methods described above, prominence scores for each unigram can be found from the complements of these bigram probabilities and the term weights. The prominence score for each unigram and/or bigram may be multiplied with their descriptiveness scores found in descriptiveness score results 310 and with the scaling factor found in seed results 320 to produce the coefficients for each unigram and/or bigram in potential document scoring vector 316. In an alternate embodiment, the scaling factor is not multiplied with the prominence scores and descriptiveness scores. Potential document scoring vector 316 may include a separate document vector and scaling factor, such as described above with respect to current document multiplier 402. Potential document scoring vector 316 is sent to dot product comparator 408 for further analysis.

Retrieved document multiplier 404 may receive multiple seed results 320, one for each potential document that contains at least one of the unigrams and/or bigrams also present in the current document. The above stated process may be repeated for each received seed results 320.

Note that potential documents may contain unigrams and/or bigrams that are not found in the current document. Retrieved document multiplier 404 does not need to query descriptive database 170 or compound likelihood database 180 to determine prominence and descriptiveness scores for these unigrams and/or bigrams since, when taking the dot product, the coefficient for these unigrams and/or bigrams is zero in current document scoring vector 314. These unigrams and/or bigrams not found in the current document, therefore, do not contribute to the final dot product, so their coefficients with respect to potential document scoring vector 316 can be ignored and set to zero. In the case where one of the words of a bigram found in the potential document is also found in the current document, a query still does not need to be made to compound likelihood database 180 since bigram probabilities for each unigram and an adjacent word may be stored in retrieval database 190, as described above. The bigram probabilities can then be used to determine a prominence score for the word found in both documents.

Dot product comparator 408 receives current document scoring vector 314 and at least one potential document scoring vector 316. In an embodiment, each potential document scoring vector 316 received is evaluated independently. Dot product comparator 408 finds the cosine between current document scoring vector 314 and potential document scoring vector 316 by taking the dot product of the two vectors. If a relatively large cosine results, that means the two vectors have a relatively smaller angle between them, indicating the two documents are more similar. As an example, if a dot product of the current document and potential document A is 0.966, and a dot product of the current document and potential document B is 0.866, then potential document A is more similar to the current document than potential document B. If potential document scoring vector 316 is a null vector, then no dot product is taken and no documents are returned to browser 112.

In an embodiment, a similarity score is cosine similarity. In a second embodiment, the similarity score accounts for a quality score associated with each document. As described above, the quality score, together with the normalization factor, comprises the scaling factor for each document vector. The dot product of the current and potential document vectors may be multiplied by the product of both document's scaling factors to obtain a similarity score. Alternatively, the same similarity score may be obtained by first multiplying each document vector by its respective scaling factor prior to computing the dot product. This alternative may be faster if, for example, scaled document vectors are stored in retrieval database 190. In a third embodiment, the second embodiment's similarity score is further enhanced by the inclusion of a multi-hit boost. Ideally, each dimension of the document vector should be weighted according to how related that unigram and/or bigram is to the respective document. For example, if the respective document contains the words "glove" and "bat," a stronger weight should be applied for "baseball" than if the respective document contained only "glove" or only "bat." Then, if two documents each have "glove" and "bat," they would be similar along three dimensions, not just two. However, a weight of zero must be given to "baseball" since it does not appear in the respective document. To account for this, a multi-hit boost may be computed. As an example, if document $D_1$ has document vector $V_1$ to which scaling factor $s_1$ has not yet been applied, and an analogous situation holds for document $D_2$, then the following equation may be used to compute the multi-hit boost:

$$M = k \sum_{i<j} (V_1(i) * V_2(i) * V_1(j) * V_2(j)) \quad (6)$$

where k is some constant, i is the ith unigram or bigram shared by documents $D_1$ and $D_2$, and $V_1(i)$ is the product of the prominence and descriptiveness scores for unigram or bigram i in document $D_1$. The same applies to j as does to i. In an embodiment, k is 5.0. The similarity score in this case is $$s_1 * s_2 * (V_1 \cdot V_2 + M) \quad (7)$$

In another case, the document vectors may have been multiplied by their respective scaling factors so that $s_1 * V_1$ and $s_2 * V_2$ are more readily available than $V_1$ and $V_2$. In this case, the following formula may be used to compute the same multi-hit boost:

$$M = \frac{k}{s_1^2 s_2^2} \sum_{i<j} ((s_1 * V_1)(i) * (s_2 * V_2)(i) * (s_1 * V_1)(j) * (s_2 * V_2)(j)) \quad (8)$$

and the same similarity score can also be computed as $$(s_1 * V_1) \cdot (s_2 * V_2) + s_1 * s_2 * M \quad (9)$$

While finding the dot products, and eventual similarity scores, for each set of scoring vectors, dot product comparator 408 may compile a listing of the most similar documents and forward them to browser 112 as similar documents 328. In an embodiment, dot product comparator 408 compiles a pre-determined number of most similar documents. For example, dot product comparator 408 may find the three most similar documents, and forward those documents to browser 112 via similar documents 328. In an alternate embodiment, dot product comparator 408 compiles all documents into similar documents 328 that have a dot product or similarity score that exceeds a pre-determined threshold. For example, dot product comparator 408 may include all documents that yield a dot product or similarity score larger than 0.9 into similar documents 328. In a third embodiment, dot product comparator 408 compiles all documents into similar documents 328 that have a dot product or similarity score that exceeds some threshold determined by the values of the other dot products or similarity scores for the other potential documents.

In this way, the current document can be compared to other documents to find those documents that are most similar to the current document.

Method

Figure 5A:
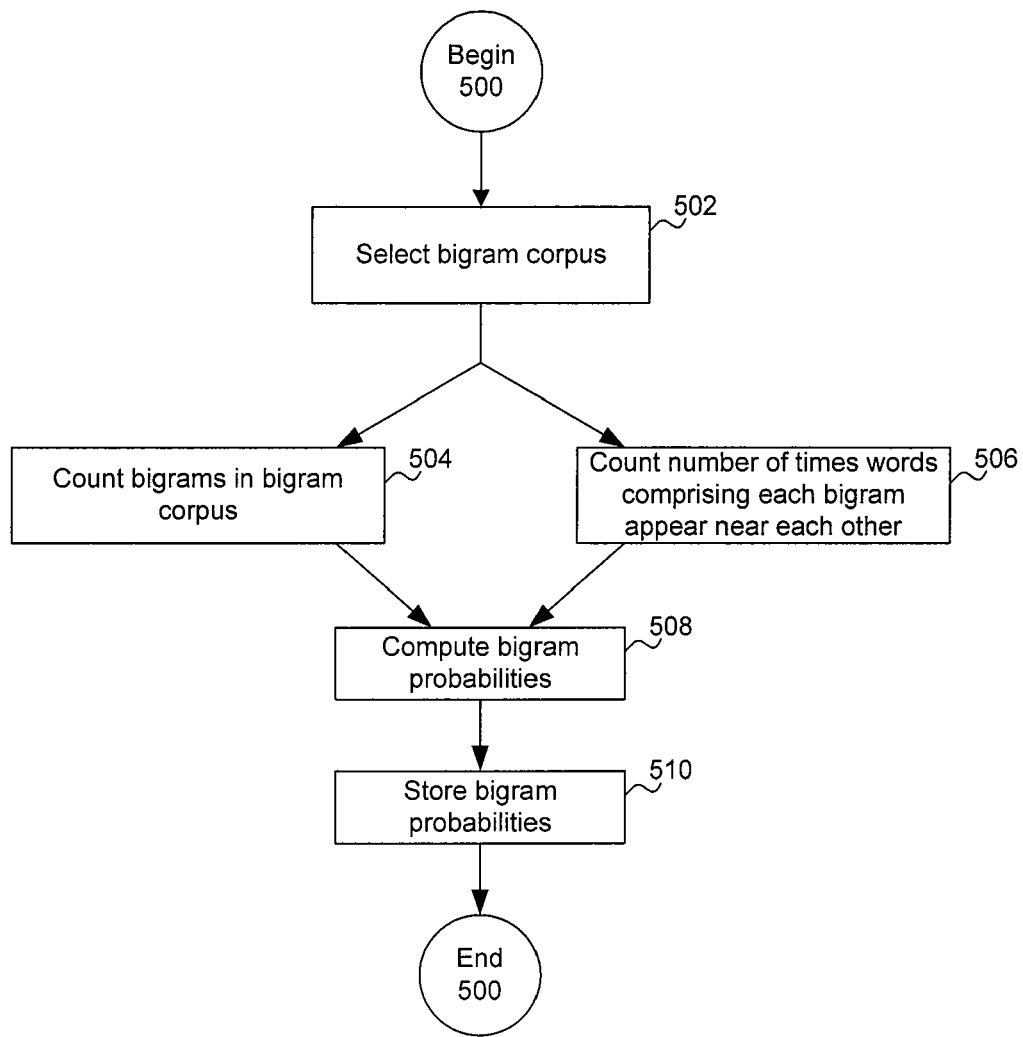
FIGS. 5A-B are flowcharts of methods for finding database values according to an embodiment of the present invention.

This section describes a method used to identify similar documents. FIG. 5A is a flowchart of a method 500 for finding bigram probabilities according to an embodiment of the present invention. While method 500 is described with respect to an embodiment of the present invention, method 500 is not meant to be limited to the present invention and may be used in other applications. In an example, method 500 may be used to seed compound likelihood database 180 from FIGS. 1-3. However, method 500 is not meant to be limited to compound likelihood database 180. As shown in FIG. 5A, method 500 begins at stage 502 where a bigram corpus is selected. In an embodiment, the bigram corpus includes documents that are representative of many types of documents. Once stage 502 is complete, method 500 proceeds to stages 504 and 506.

In an embodiment, stages 504 and 506 are completed in parallel. In a second embodiment, not shown, stage 504 is completed before stage 506 begins. In a third embodiment, not shown, stage 506 is completed before stage 504 begins. At stage 504, the bigrams in the bigram corpus are counted. At stage 506, the number of times the two words comprising each bigram appear near each other in the bigram corpus is counted. In an embodiment, two words appearing near each other includes those words that appear in the same sentence. In an alternate embodiment, two words appearing near each other includes those words that have X words or fewer between them. As an example, if there are five words between the first word of a bigram and the second word of a bigram, then this may constitute as the two words appearing near each other.

In an embodiment, the counting in stages 504 and 506 are implemented as a MapReduce. For example, stage 504 may be implemented by first taking files holding slices of the bigram corpus and assigning these slices to different machines. Each machine proceeds to count the bigrams found in its assigned slice(s). At a same or different time, the space of bigrams is partitioned and each partition is then assigned to a machine. Once the machines are finished counting, each reports its individual bigram counts to the machine responsible for the partition containing the respective bigram. The reported counts are summed to arrive at the final bigram count. This process can also be used to implement stage 506 by counting nearby pairs instead of bigrams. Stages 504 and 506 may be implemented in a same or different MapReduce.

Method 500 proceeds to stage 508 once stages 504 and 506 are complete. Stage 508 includes computing the bigram probability for each bigram based on the results found in stages 504 and 506. In an embodiment, this computation is directly related to the results of stage 504 and indirectly related to the results of stage 506. Once stage 508 is complete, method 500 proceeds to stage 510.

At stage 510, the bigram probabilities computed in stage 508 are stored in a compound likelihood database, such as, for example, compound likelihood database 180 of FIGS. 1-3. Once stage 510 is complete, method 500 ends.

Stages 502, 504, 506, 508, and 510 may be implemented as software, hardware, firmware, or any combination thereof.

Figure 5B:
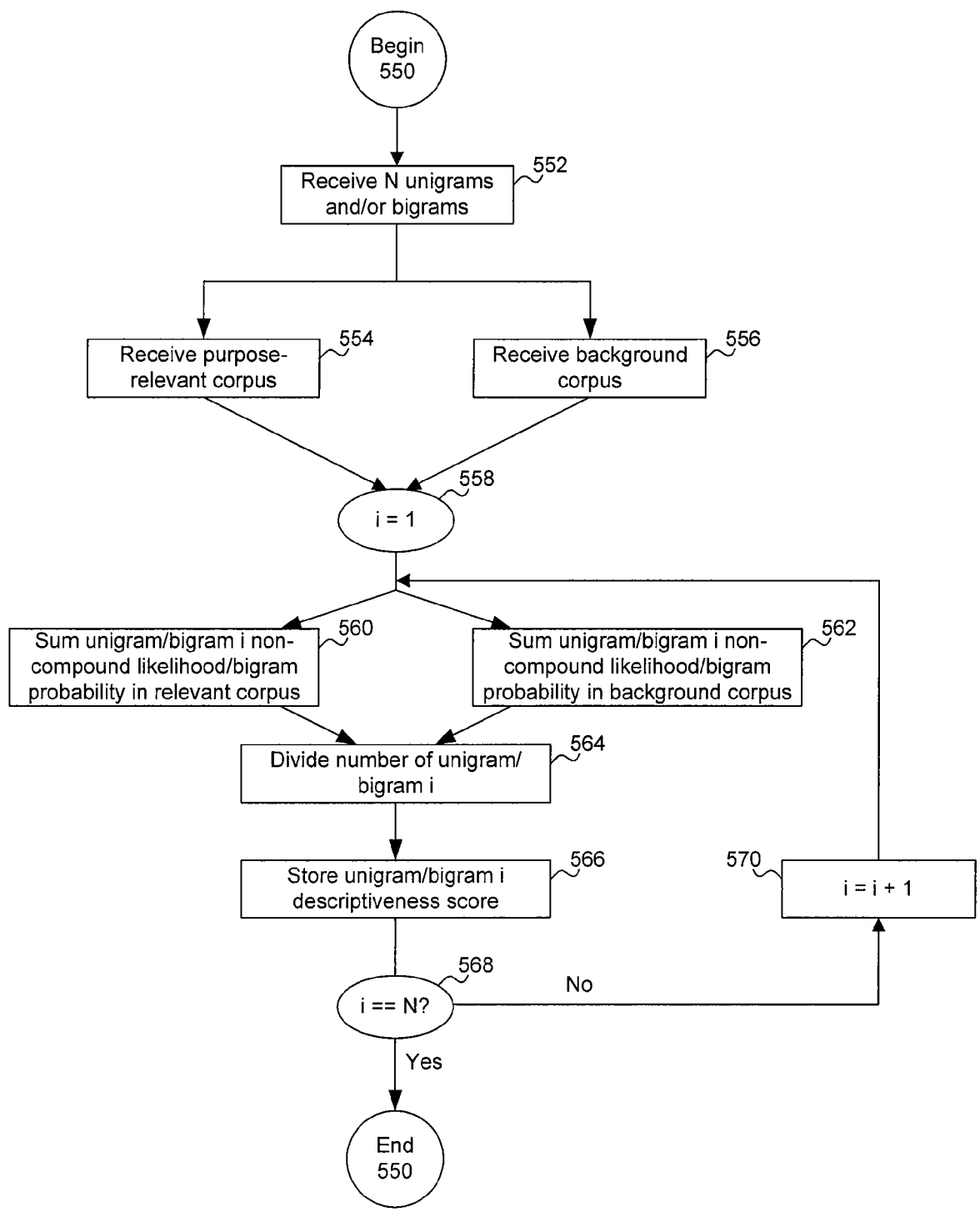

FIG. 5B is a flowchart of a method 550 for finding descriptiveness scores according to an embodiment of the present invention. While method 550 is described with respect to an embodiment of the present invention, method 550 is not meant to be limited to the present invention and may be used in other applications. In an example, method 550 may be used to seed descriptive database 170 from FIGS. 1-3. However, method 550 is not meant to be limited to descriptive database 170. As shown in FIG. 5B, method 550 begins at stage 552 where N unigrams and/or bigrams are received. In an embodiment, the N unigrams and/or bigrams originate from a list of unigrams and/or bigrams. As an example, the list of unigrams and/or bigrams may have been compiled from a corpus of documents representative of many types of documents.

Once stage 552 is complete, method 550 proceeds to stages 554 and 556, where two corpora are received. In an embodiment, stages 554 and 556 are completed in parallel. In a second embodiment, not shown, stage 554 is completed before stage 556 begins. In a third embodiment, not shown, stage 556 is completed before stage 554 begins.

At stage 554, a purpose-relevant corpus is received. In an embodiment, the purpose-relevant corpus includes a distribution of word occurrences that resembles a distribution in a corpus from which a current document is drawn.

At stage 556, a background corpus is received. In an embodiment, the background corpus includes documents that are representative of many types of documents. As an example, the background corpus may include documents found on the Internet. Once stages 554 and 556 are complete, method 550 proceeds to stage 558.

At stage 558, variable i is set to be equal to one. Once this is complete, method 550 proceeds to stages 560 and 562.

In an embodiment, stages 560 and 562 are completed in parallel. In a second embodiment, not shown, stage 560 is completed before stage 562 begins. In a third embodiment, not shown, stage 562 is completed before stage 560 begins. If i is a unigram, stage 560 includes summing the non-compound likelihood each time unigram i appears in the purpose-relevant corpus. If i is a bigram, stage 560 includes summing the bigram probability each time bigram i appears in the purpose-relevant corpus. If i is a unigram, stage 562 includes summing the non-compound likelihood each time unigram i appears in the background corpus. If i is a bigram, stage 562 includes summing the bigram probability each time bigram i appears in the background corpus.

In an alternate embodiment, not shown, stages 560 and 562 may be implemented using a MapReduce such as is described with respect to stages 504 and 506 above. This would eliminate the need for stages 558, 568, and 570 as all unigrams/bigrams may be analyzed at once, instead of one at a time.

Once stages 560 and 562 are complete, method 550 continues to stage 564. At stage 564, the number of times unigram or bigram i appears in the purpose-relevant corpus is divided by the number of times unigram or bigram i appears in the background corpus. This division results in a descriptiveness score for unigram or bigram i. Once stage 564 is complete, method 550 proceeds to stage 566.

At stage 566, the descriptiveness score for unigram or bigram i is stored in a descriptive database, such as, for example, descriptive database 170 of FIGS. 1-3. Once stage 566 is complete, method 550 proceeds to stage 568.

At stage 568, a check is performed to see if i equals N. If i and N are equal, method 550 ends. If i and N are not equal, method 550 proceeds to stage 570.

At stage 570, i is incremented by one. Once this is complete, method 550 returns to stages 560 and 562.

Stages 552, 554, 556, 558, 560, 562, 564, 566, 568, and 570 may be implemented as software, hardware, firmware, or any combination thereof.

Figure 6:
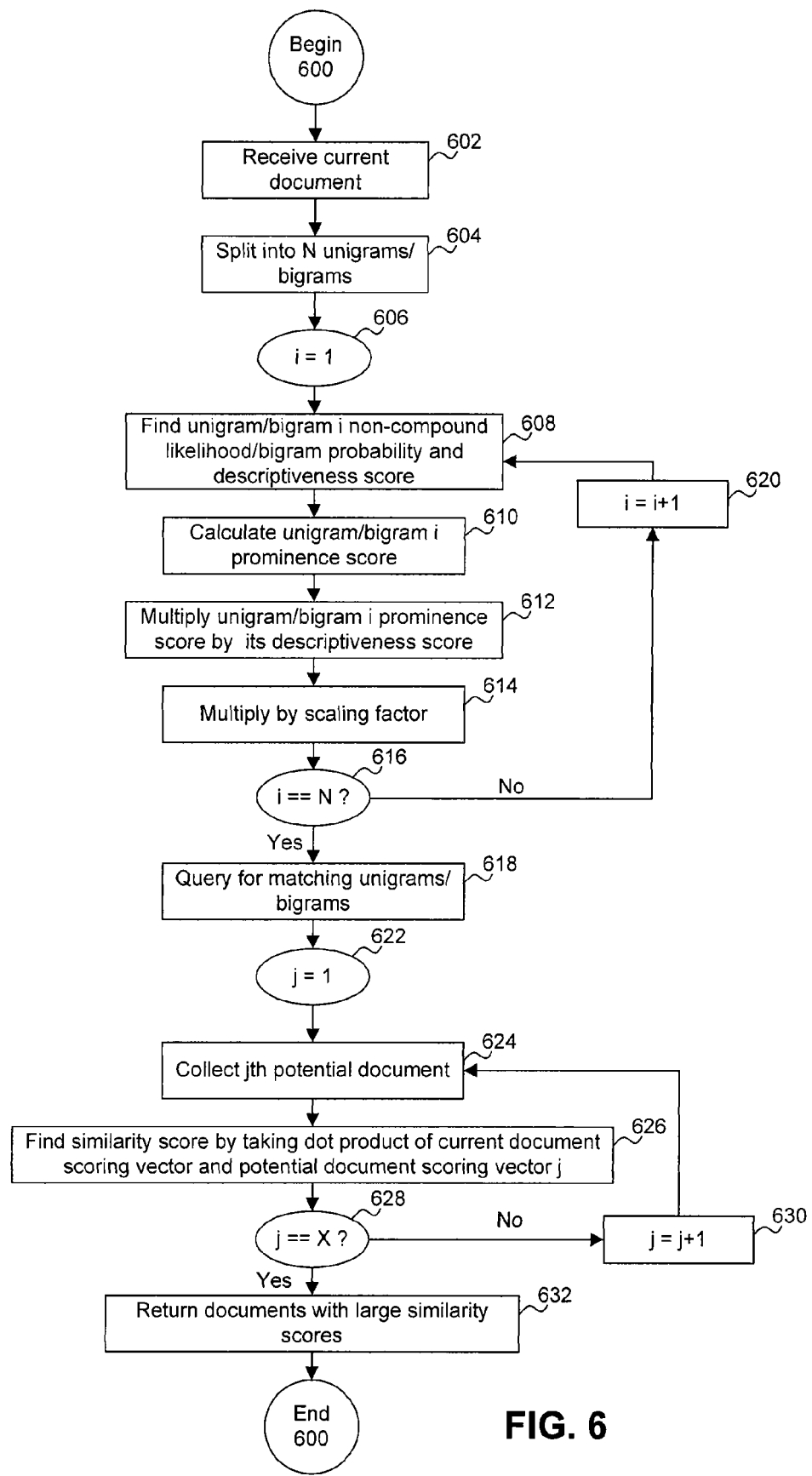
FIG. 6 is a flowchart of a method for measuring how similar documents are according to an embodiment of the present invention.

FIG. 6 is a flowchart of a method 600 for measuring how similar documents are according to an embodiment of the present invention. In an example, method 600 may be used in operation of system 100 from FIGS. 1-3. However, method 600 is not meant to be limited to system 100. As shown in FIG. 6, method 600 begins at stage 602 where a current document including its metadata is received. Once stage 602 is complete, method 600 continues to stage 604.

At stage 604, the metadata is split into N unigrams and/or bigrams. Each unigram is also annotated with its preceding and following words to aid in determining its non-compound likelihood. In an embodiment, the metadata is split into N unigrams and/or bigrams by document parser 406 of FIG. 4. Once stage 604 is complete, method 600 proceeds to stage 606.

At stage 606, variable i is set to be equal to one. In an embodiment, a query processor, such as, for example, query processor 230 of FIG. 2 may implement stages 602, 604, and 606. Once stage 606 is complete, method 600 advances to stage 608.

At stage 608, the bigram probability or non-compound likelihood and descriptiveness score for unigram or bigram i is found. In an embodiment, the bigram probability or non-compound likelihood is found based on a query to a database, such as, for example, compound likelihood database 180 of FIGS. 1-3, and the descriptiveness score is found by querying a database, such as, for example, descriptive database 170 of FIGS. 1-3. Prominence calculator 210 and feature extractor 220 of FIGS. 1-3 may query the databases. Once the results have been received, method 600 proceeds to stage 610.

At stage 610, the prominence score for unigram or bigram i is calculated. As described in the algorithm above, the prominence score for unigram or bigram i is based on the bigram probability and the term weight associated with the particular metadata field unigram or bigram i is located in. In an embodiment, the prominence score is calculated in prominence calculator 210.

Once stage 610 is complete, method 600 continues to stage 612. At stage 612, the prominence score of unigram or bigram i is multiplied by its descriptiveness score. In an embodiment, current document multiplier 402 of FIG. 4 completes this operation. Once stage 612 is complete, method 600 proceeds to stage 614.

At stage 614, the multiplied value resulting from stage 612 is multiplied by a scaling factor. As described above, the scaling factor may include a normalization calculation and a quality factor. This produces a coefficient for dimension unigram or bigram i in a current document vector. Again, in an embodiment, current document multiplier 402 completes this operation. In an alternate embodiment, not shown, stage 614 may be completed at any stage after stage 626. In this case, two scaling factors would be multiplied for each pair of documents: one scaling factor for the current document scoring vector and one scaling factor for the potential document scoring vector. If the scaling factors have been applied prior to stage 626, then the dot product computed in stage 626 is known as a similarity score because the dot product has been performed on scaled document vectors. If the scaling factors have been applied after stage 626, then the dot product computed in stage 626 is still known as a dot product until the scaling factors are applied. The following stages are described for the case where the scaling factors are applied in stage 614. Once stage 614 is complete, method 600 proceeds to stage 616.

At stage 616, a check is performed to see if i equals N. If i and N are equal, method 600 continues to stage 618. If i and N are not equal, method 600 proceeds to stage 620.

At stage 618, a query requesting documents that match at least one of the unigrams and/or bigrams is sent to a database, such as, for example, retrieval database 190 of FIGS. 1-3. In an embodiment, document parser 406 initiates the query. Once stage 618 is complete, method 600 advances to stage 622.

At stage 620, i is incremented by one. Once this is complete, method 600 returns to stage 608.

At stage 622, variable j is set to be equal to 1. Once stage 622 is complete, method 600 continues to stage 624.

At stage 624, the jth potential document that matched any unigram or bigram i is collected for analysis. In an embodiment, retrieved document multiplier 404 of FIG. 4 collects this document. Once this is complete, method 600 proceeds to stage 626.

At stage 626, a similarity score is found by taking the dot product of the current document scoring vector and a potential document scoring vector j that represents a scoring vector of the jth potential document that matched a query for any unigram or bigram i. In an embodiment, dot product comparator 408 of FIG. 4 performs the dot product computation. Once stage 626 is complete, method 600 proceeds to stage 628.

At stage 628, a check is performed to see if j equals X, where X represents the total number of potential documents found. If j and X are equal, method 600 advances to stage 632. If j and X are not equal, method 600 continues to stage 630.

At stage 630, j is incremented by one. Once this is complete, method 600 returns to stage 624.

At stage 632, those matched documents that lead to a large similarity score are returned to a user through a browser, such as, for example, browser 112 of FIGS. 1-3. The similarity score may be considered large if it exceeds some pre-determined threshold. The similarity score may be considered large if it exceeds some threshold determined by the values of the other similarity scores for the other matched documents. Alternatively, the matched documents may be returned to the user if it leads to one of the top Y similarity scores, where Y is some constant. In an embodiment, dot product comparator 408 returns the matched documents to the user. Once stage 632 is complete, method 600 ends.

FIG. 7 is an example similar document identification calculation according to an embodiment of the present invention. As an example, FIG. 7 may graphically represent stages 608, 610, 612, and 614 of FIG. 6. In this case, FIG. 7 shows an example of a photo document. As shown in FIG. 7, metadata fields of a current document are represented by "Album title" 702 and "Photo description" 722. "Album title" 702 includes the text "Paris and the Eiffel Tower," and "Photo description" 722 includes the text "Rachel and her cat visit the Eiffel Tower." Other metadata fields may be present, as is discussed below, however no text is present in these metadata fields.

The text in the metadata fields has been arranged into unigrams and bigrams. In this case, prepositions, conjunctions, stop words, and other common words have been ignored, so "and," "her," and "the" are not included in any unigram or bigram. The unigrams include "Rachel" 706, "cat" 708, "visit" 710, "Eiffel" 712, "Tower" 714, and "Paris" 726. The bigrams include "cat visit" 716 and "Eiffel Tower" 718.

Bigram probabilities 740 lists the bigram probabilities for each bigram. In an embodiment, these values were determined based on the algorithm mentioned above with respect to prominence calculator 210 of FIGS. 2-3 and stored in a database, such as, for example, compound likelihood database 180 of FIGS. 1-3.

Non-compound likelihoods 730 lists the non-compound likelihoods for each unigram. In an embodiment, these values were determined based on the algorithm mentioned above with respect to prominence calculator 210 and bigram probabilities stored in a database, such as, for example, compound likelihood database 180. For example, notice the non-compound likelihood for "cat" 708 is 0.9 and the bigram probability for "cat visit" 716 is 0.1. Since "her" is not included in any unigram or bigram, there is no bigram probability for "her cat." In this case, the bigram probability for "her cat" is assumed to be zero. Using the algorithms mentioned above with respect to prominence calculator 210, the non-compound likelihood of "cat" 708 should be the multiplication of the complement of the bigram probability for "cat visit" 716 and the complement of the bigram probability for "her cat," since "her" is to the left of "cat" 708, and "visit" 710 is to the right of "cat" 708. This results in (1−0) times (1−0.1), or 0.9. The same method can be applied for the other unigrams.

Term weights 750 lists the weights given to each metadata field. In this case, five metadata fields are present for this particular document, "Photo tag" 720, "Photo description" 722, "Album title" 702, "Album location" 724, and "Album description" 704. The term weights for the two metadata fields that are used, "Album title" 702 and "Photo description" 722, are 2.5 and 4.0, respectively. As discussed above with respect to prominence calculator 210, prominence scores are found by multiplying a unigram's non-compound likelihood by a term weight or by multiplying a bigram's bigram probability by a term weight.

Prominence scores 760 list prominence scores for each unigram and bigram. As shown in FIG. 7, three significant figures are shown. However, any number of significant figures may be used to differentiate between unigrams and bigrams. "Eiffel Tower" 718 has the highest prominence score. Note that "Eiffel Tower" 718 appears in both "Album title" 702 and "Photo description" 722. Since "Photo description" 722 carries a higher weight, that weight was used when calculating the prominence score for "Eiffel Tower" 718.

Descriptiveness scores 770 list descriptiveness scores for each unigram and bigram. As mentioned above, these descriptiveness scores may be stored in a database, such as, for example, descriptive database 170 of FIGS. 1-3.

Scaling Factor 780 lists the square of the multiplication of each prominence and descriptiveness score ($(P*D)^2$) for each unigram and bigram, and the quality score (QS) and scaling factor (SF) for the current document. The normalization for the current document is also given, derived from the prominence and descriptiveness scores, as described in equation (3). For the quality score calculation, it is assumed that variable a of equation (5) is equal to 1.2 and "Photo Tag" 720 and "Photo Description" 722 are deemed important metadata fields, while "Album Title" 702, "Album Location" 724, and "Album Description" 704 are deemed less important fields.

Vector coefficients can be found by multiplying descriptiveness scores, prominence scores, and scaling factors. Vector coefficients 790 lists the vector coefficients for each unigram and bigram. In this example, "Eiffel Tower" 718 carries the highest vector coefficient. This may indicate that "Eiffel Tower" 718 is a term that most describes the current document, and is the term that most likely would be found in similar documents.

As mentioned above, non-celebrity names, such as "Rachel" 706, may be down-weighted since they may be ambiguous. The vector coefficients then may be further altered to tweak the vector for the current document.

CONCLUSION

It is to be appreciated that the detailed description section, and not the summary and abstract sections, is intended to be used to interpret the claims. The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for identifying similar documents, comprising:
   (a) receiving document text for a current document that includes at least two words;
   (b) calculating:
      a prominence score for each word, wherein the prominence score for each word is based on a term weight and a non-compound likelihood for each word,
      a prominence score for each pair of consecutive words, wherein the prominence score for each pair of consecutive words is based on a term weight and a compound probability for each pair of consecutive words,
      a descriptiveness score for each word wherein the descriptiveness score for each word is based on a corpus, and
      a descriptiveness score for each pair of consecutive words, wherein the descriptiveness score for each pair of consecutive words is based on the corpus;
   (c) calculating a comparison metric for the current document, wherein the comparison metric is based on the combination of each prominence score and each descriptiveness score;
   (d) finding, using a query processor, at least one potential document, wherein document text for each potential document includes at least one word from the current document; and
   (e) analyzing each found potential document to identify at least one similar document as a function of a comparison metric for the respective potential document and the comparison metric for the current document.

2. The method of claim 1, wherein the analyzing step (e) comprises:
   calculating, for each potential document, a dot product of a scoring vector for the respective potential document and a scoring vector for the current document, wherein the scoring vectors are based on each document's respective comparison metric.

3. The method of claim 1, wherein the analyzing step (e) comprises:
   identifying the at least one similar document based on the comparison metric of each potential document and the current document, wherein potential documents with a comparison metric above a threshold are selected for identification.

4. The method of claim 2, wherein calculating the dot product further comprises:
   (i) calculating a normalization factor for each scoring vector, wherein the normalization factor converts each scoring vector into unit length;
   (ii) calculating a quality score for each scoring vector based on term weights of each respective word; and
   (iii) multiplying each dot product by the quality score and the inverse of the normalization factor for the respective potential document and by the quality score and the inverse of the normalization factor for the current document.

5. The method of claim 1, wherein the non-compound likelihood for each word is based on a probability that each respective word and a word to the left of the respective word do not combine to form a word compound and a probability that each respective word and a word to the right of the respective word do not combine to form a word compound.

6. The method of claim 1, wherein the compound probability for each pair of consecutive words is based on a number of times each respective word pair appears in a training corpus and a number of times a first word and a second word of each respective word pair appear within a certain distance of each other in the training corpus.

7. The method of claim 1, wherein the term weight is based on a location of the respective word in the document text.

8. The method of claim 1, wherein calculating the descriptiveness score comprises:
   calculating a frequency of each word or pair of consecutive words in a purpose-relevant corpus and a frequency of each word or pair of consecutive words in a background corpus.

9. The method of claim 8, wherein the purpose-relevant corpus includes a corpus of documents that are relevant in performing a desired task on the current document.

10. The method of claim 1, further comprising:
    (f) outputting a signal representing each similar document to a user via a communication network.

11. A system for identifying similar documents, comprising:
    a processor and a memory;
    a query processor using the processor and the memory;
    a compound likelihood database, that stores bigram probabilities for a first set of words;
    a descriptive database, that stores descriptiveness scores for a second set of words, wherein the first set of words and the second set of words includes common words; and
    a similar document identifier configured to receive document text for a current document, wherein the document text includes at least two document words, wherein the similar document identifier uses the query processor, the query processor configured to identify at least one similar document based on prominence scores and descriptiveness scores for each document word and pair of consecutive document words, wherein the prominence scores are based on results from a query to the compound likelihood database and the descriptiveness scores are received based on a query to the descriptive database, and wherein the prominence score for each word is further based on a term weight and a non-compound likelihood for each word;

the prominence score for each pair of consecutive words is based on a term weight and a compound probability for each pair of consecutive words;

the descriptiveness score for each word is based on a corpus, and the descriptiveness score for each pair of consecutive words is based on the corpus.

12. The system of claim 11, wherein
the query processor is further configured to:
find at least one potential document, wherein document text for each potential document includes at least one of the document words from the current document,
analyze each potential document to identify each similar document as a function of a comparison metric for the respective potential document and a comparison metric for the current document, and
output a signal representing each similar document to a user via a communication network; and the similar document identifier further comprises:
a feature extractor, configured to determine the comparison metric for the current document and the potential document, wherein the comparison metric is based on a combination of the prominence scores and the descriptiveness scores for each document word and pair of consecutive document words; and
a prominence calculator, configured to calculate the prominence scores based on the results from the compound likelihood database.

13. The system of claim 12, wherein the query processor identifying each similar document comprises:
calculating, for each potential document, a dot product of a scoring vector for the respective potential document and a scoring vector for the current document, wherein the scoring vectors are based on each document's respective comparison metric; and
using the calculated scoring vectors to identify a similar document.

14. The system of claim 12, wherein the query processor identifying each similar document comprises:
identifying the at least one similar document based on the comparison metric of each potential document, wherein potential documents with a comparison metric above a threshold are selected for identification.

15. The system of claim 13, wherein calculating the dot product further comprises:
(i) calculating a normalization factor for each scoring vector, wherein the normalization factor converts each scoring vector into unit length;
(ii) calculating a quality score for each scoring vector based on term weights of each respective word; and
(iii) multiplying the dot product by the quality score and the inverse of the normalization factor for the respective potential document and by the quality score and the inverse of the normalization factor for the current document.

16. The system of claim 11, wherein the non-compound likelihood for each word is based on a probability that each respective word and a word to the left of the respective word do not combine to form a word compound and a probability that each respective word and a word to the right of the respective word do not combine to form a word compound.

17. The system of claim 11, wherein the compound probability for each pair of consecutive words comprises a number of times each respective word pair appears in a training corpus and a number of times a first word and a second word of each respective word pair appear within a certain distance of each other in the training corpus.

18. The system of claim 17, wherein the term weight is based on a location of the respective word in the document text.

19. A computer-implemented method for scoring documents, comprising:
(a) receiving document text for a current document that includes at least two words;
(b) calculating a prominence score and a descriptiveness score for each word from the current document and each pair of consecutive words from the current document, wherein:
the prominence score for each word is based on a term weight and a non-compound likelihood for each word,
the prominence score for each pair of consecutive words is based on a term weight and a bigram probability for each pair of consecutive words,
a descriptiveness score for each word is based on a corpus,
a descriptiveness score for each pair of consecutive words is based on the corpus; and
(c) creating a scoring vector for the current document, wherein the scoring vector is based on the combination of each prominence score and each descriptiveness score.

20. The method of claim 19, wherein the non-compound likelihood is based on a probability that each respective word and a word to the left of the respective word do not combine to form a word compound and a probability that each respective word and a word to the right of the respective word do not combine to form a word compound.

21. The method of claim 19, wherein the bigram probability comprises a number of times each respective word pair appears in a training corpus and a number of times a first word and a second word of each respective word pair appear within a certain distance of each other in the training corpus.

22. The method of claim 21, wherein the term weight of each respective word is based on a location of the respective word in the document text.

23. The method of claim 19, wherein calculating the descriptiveness score comprises:
calculating a frequency of each word or pair of consecutive words in a purpose-relevant corpus and a frequency of each word or pair of consecutive words in a background corpus.

24. The method of claim 23, wherein the purpose-relevant corpus includes a corpus of documents that are relevant in performing a desired task on the current document.

25. The method of claim 19, wherein the scoring vector creating step (c) further comprises:
(i) normalizing the scoring vector, wherein the normalization converts the scoring vector into unit length; and
(ii) multiplying the normalized scoring vector by a quality score, wherein the quality score is based on the term weight of each word.

* * * * *